(12) United States Patent
Stevens et al.

(10) Patent No.: US 10,881,076 B1
(45) Date of Patent: Jan. 5, 2021

(54) CALF CREEP FEEDER

(71) Applicants: Doug Stevens, Norfolk, NE (US); Scott Stevens, Norfolk, NE (US)

(72) Inventors: Doug Stevens, Norfolk, NE (US); Scott Stevens, Norfolk, NE (US)

(*) Notice: Subject to any disclaimer, the term of this patent is extended or adjusted under 35 U.S.C. 154(b) by 170 days.

(21) Appl. No.: 15/627,885

(22) Filed: Jun. 20, 2017

Related U.S. Application Data (63) Continuation-in-part of application No. 14/832,102, filed on Aug. 21, 2015, now Pat. No. 9,693,534.

(51) Int. Cl.
*A01K 1/00* (2006.01)
*A01K 5/01* (2006.01)
*A01K 5/02* (2006.01)

(52) U.S. Cl.
CPC .......... *A01K 1/0029* (2013.01); *A01K 5/0107* (2013.01); *A01K 5/0225* (2013.01)

(58) Field of Classification Search
CPC .......... A01K 5/00; A01K 5/01; A01K 5/0107; A01K 5/02; A01K 5/0225; A01K 5/0275; A01K 15/04; A01K 15/006; A01K 1/10; A01K 1/105; A01K 3/00; A01K 3/002; A01K 1/0029; A01K 1/0017; A01K 1/0005; A01K 1/00; A01K 1/0035; A01K 1/0088; A01K 1/0094; A01K 1/0209; E04H 17/18; E04H 17/16; A47D 13/061; A47D 13/066; A47D 11/007; E04B 1/343; E04B 1/34357; E04B 1/34363; E04B 1/34384; E04B 1/344; E04B 1/3441; E04B 2001/5868
See application file for complete search history.

(56) References Cited

U.S. PATENT DOCUMENTS

| 2,863,419 | A |   | 12/1958 | Murrell |              |
|-----------|---|---|---------|---------|--------------|
| 4,334,502 | A | * | 6/1982  | Cox     | A01K 5/0107  |
|           |   |   |         |         | 119/53       |
| 4,537,151 | A | * | 8/1985  | Bolton  | A01K 3/00    |
|           |   |   |         |         | 119/512      |
| 5,209,183 | A | * | 5/1993  | Sampson | A01K 5/0107  |
|           |   |   |         |         | 119/53       |
| 5,218,925 | A | * | 6/1993  | Anderson| A01K 1/0088  |
|           |   |   |         |         | 119/501      |
| 5,381,757 | A | * | 1/1995  | Putney  | A01K 3/00    |
|           |   |   |         |         | 119/512      |

(Continued)

FOREIGN PATENT DOCUMENTS

| CA | 2119844    |   | 4/1995 |             |
|----|------------|---|--------|-------------|
| CA | 2119844 A1 | * | 4/1995 | A01K 5/0107 |

OTHER PUBLICATIONS

Work Weld Inc., Armour, SD, http://www.werkweld.com/CreepFeeders.html, Creep Feeders, internet archive WayBackMachine Mar. 25, 2006-Nov. 3, 2016.

(Continued)

*Primary Examiner* — Kathleen I Alker
(74) *Attorney, Agent, or Firm* — Dennis L. Thomte; Thomte Patent Law Office LLC (57) ABSTRACT

A calf creep feeder includes a panel fence positioned at each side of a feed enclosure. Each of the panel fences are selectively movable between a lower creep feeder position to an upper stowed position. A pair of torsion springs are secured to each of the panel fences to assist in raising the panel fences from their lower creep feeder positions to its upper stowed position.

2 Claims, 6 Drawing Sheets

(56) References Cited

U.S. PATENT DOCUMENTS

| | | | | |
|---|---|---|---|---|
| 5,622,141 | A * | 4/1997 | Lareva | A01K 1/0029 |
| | | | | 119/843 |
| 6,213,053 | B1 | 4/2001 | Lammers | |
| 6,477,985 | B1 * | 11/2002 | Mennenga | A01K 1/0236 |
| | | | | 119/474 |
| 7,325,513 | B1 * | 2/2008 | Velasquez | A01K 1/0236 |
| | | | | 119/400 |
| 8,616,531 | B2 * | 12/2013 | Hough | E04H 17/003 |
| | | | | 256/11 |
| 9,339,008 | B1 * | 5/2016 | Getz | A01K 5/01 |
| 9,456,581 | B2 * | 10/2016 | Anderson | A01K 3/002 |
| 9,693,534 | B1 | 7/2017 | Stevens et al. | |
| 10,206,369 | B2 * | 2/2019 | Niemela | A01K 3/00 |
| 2002/0139315 | A1 * | 10/2002 | Calvert | A01K 3/00 |
| | | | | 119/512 |
| 2008/0236502 | A1 | 10/2008 | Elias et al. | |
| 2009/0293811 | A1 | 12/2009 | Wersal | |
| 2015/0320017 | A1 * | 11/2015 | Hepp | A01K 39/0113 |
| | | | | 119/52.3 |

OTHER PUBLICATIONS

Patriot Products, Minden, NE, http://patriotequip.com/products/livestock-equipment/d-series-creep feeder/, internet archive WayBackMachine Apr. 18, 2014-Nov. 6, 2016.

Apache Equipment, Bison Industries, Inc. http://apacheequipment.com/apache/creep_feeders.asp, internet archive WayBackMachine Jan. 17, 2013-Nov. 4, 2016.

* cited by examiner

FIG. 6

CALF CREEP FEEDER

CROSS-REFERENCE TO RELATED APPLICATION

This application is a Continuation-in-Part application of U.S. application Ser. No. 14/832,102, filed Aug. 21, 2015, entitled CALF CREEP FEEDER.

BACKGROUND OF THE INVENTION

Field of the Invention

This invention relates to a calf creep feeder and more particularly to a calf creep feeder wherein the fence panels at the opposite sides of the creep feeder may be selectively moved from a lower creep feeder position to an elevated folded or stowed position for transport or to enable the feeder to be utilized as a self-feeder. More particularly, this invention relates to lift assist springs which enable the fence panels to be easily moved from the lower creep feeder position to the transport/self-feeder position.

Description of the Related Art

In the cattle feeding business, creep feeders have been provided to supply feed to young calves prior to and subsequent to weaning. The prior art calf creep feeders normally include a portable feeder having feed troughs or feed discharge openings at the opposite sides thereof. A foldable fence is provided at each side of the feeder which enables calves to enter a feeding area associated with the feeder so that the calves have access to the feed but which prevents larger cows from entering the feeding areas. Usually, the fences at each side of the feeder are selectively movable from a lower feeding position to an upper stowed position at the side of the feeder. The fences are quite heavy and are difficult for a person to manually raise the fence from the lower creep feeding position to the upper stowed position.

The invention of the co-pending application utilizes elongated coil springs, as lift spring assists, to enable a person to more easily raise the fence from the lower creep feeder position to the upper stowed position. Although the elongated coil springs of the co-pending application function extremely well, an improved lift spring assist is disclosed herein.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A calf creep/self-feeder is disclosed which includes a wheeled frame having a forward end, a rearward end, a first side and a second side. The feeder will be described as being mounted on a wheeled frame but the frame could be of the skid type. A feed enclosure is mounted on the wheeled frame and has a forward wall, a rearward wall, and first and second side walls with the first and second side walls having feed discharge openings formed therein. A first fence including first and second side panels and an entrance panel is provided at the first side of the feed enclosure which is selectively movable between a lower creep feeder position to an upper transport/self-feeder position. A pair of helical torsion springs are connected to the first fence to assist in raising the first fence from the lower creep feeder position to the upper transport/self-feeder position.

A second fence including first and second side panels and an entrance panel is provided at the second side of the feed enclosure which is selectively movable between a lower creep feeder position to an upper transport/self-feeder position. A pair of helical torsion springs are connected to the second fence to assist in raising the second fence from the lower creep feeder position to the upper transport/self-feeder position. The feeder may consist of only a single fence at one side of the feeder in some cases.

A principal object of the invention is to provide an improved calf creep feeder.

A further object of the invention is to provide a calf creep feeder wherein lift assist springs are connected to the fence or fences of the feeder to assist in raising the fence or fences from a lower creep feeder position to an upper transport/self-feeder position.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The creep feeder of this invention is designated by the reference numeral 10. As will be explained in detail hereinafter, the feeder 10 may also be used as a self-feeder.

Feeder 10 includes a wheeled frame 12. As stated above, the feeder frame may be of the skid type. Frame 12 includes a hitch or tongue (not shown) which extends forwardly from the forward end thereof. A feed enclosure 14 is mounted on frame 12 in conventional fashion. Feed enclosure 14 includes an upstanding forward wall 16, an upstanding rearward wall 18, a first side wall 20, a second side wall 22, and a removable lid or cover 24. For purposes of description, feed enclosure 14 will be described as having a forward end 26, a rearward end 28, a first side 30 and a second side 31. Each of side walls 20 and 22 have conventional feed discharge openings formed therein as well as conventional feed troughs 32. As will be described in more detail hereinafter, a plate 33 is welded to the exterior surface of forward wall 16 of feed enclosure 14. Plate 33 includes a base portion 33A, a side wall 33B, and an outer end wall 33C which define a pocket 33D. Base portion 33A has a bolt opening 33E formed therein which registers with a bolt opening formed in the forward wall 16 of feed enclosure 14.

Figure 3:
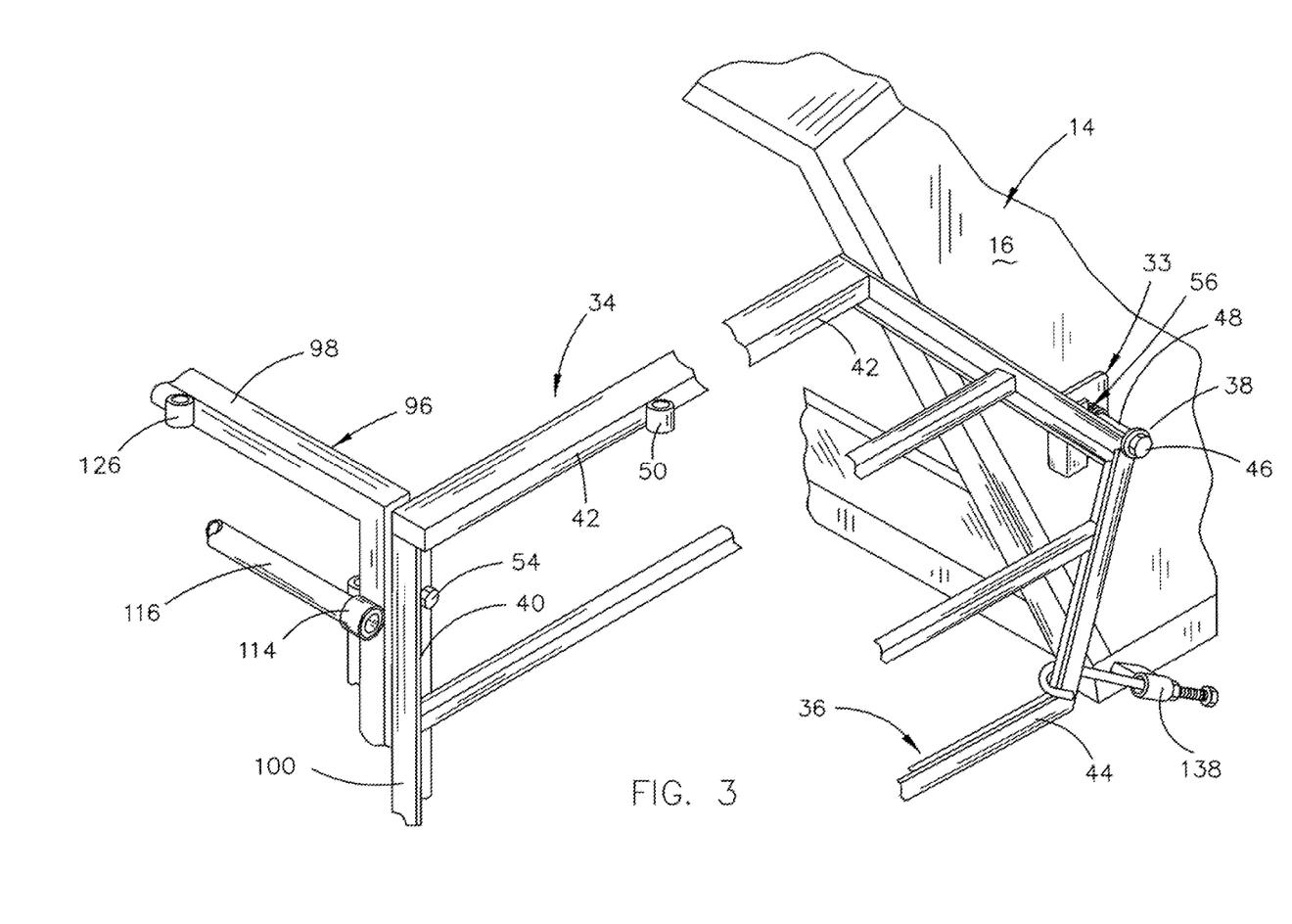
FIG. 3 is a partial perspective view of one of the panel fences of this invention.
Figure 4:
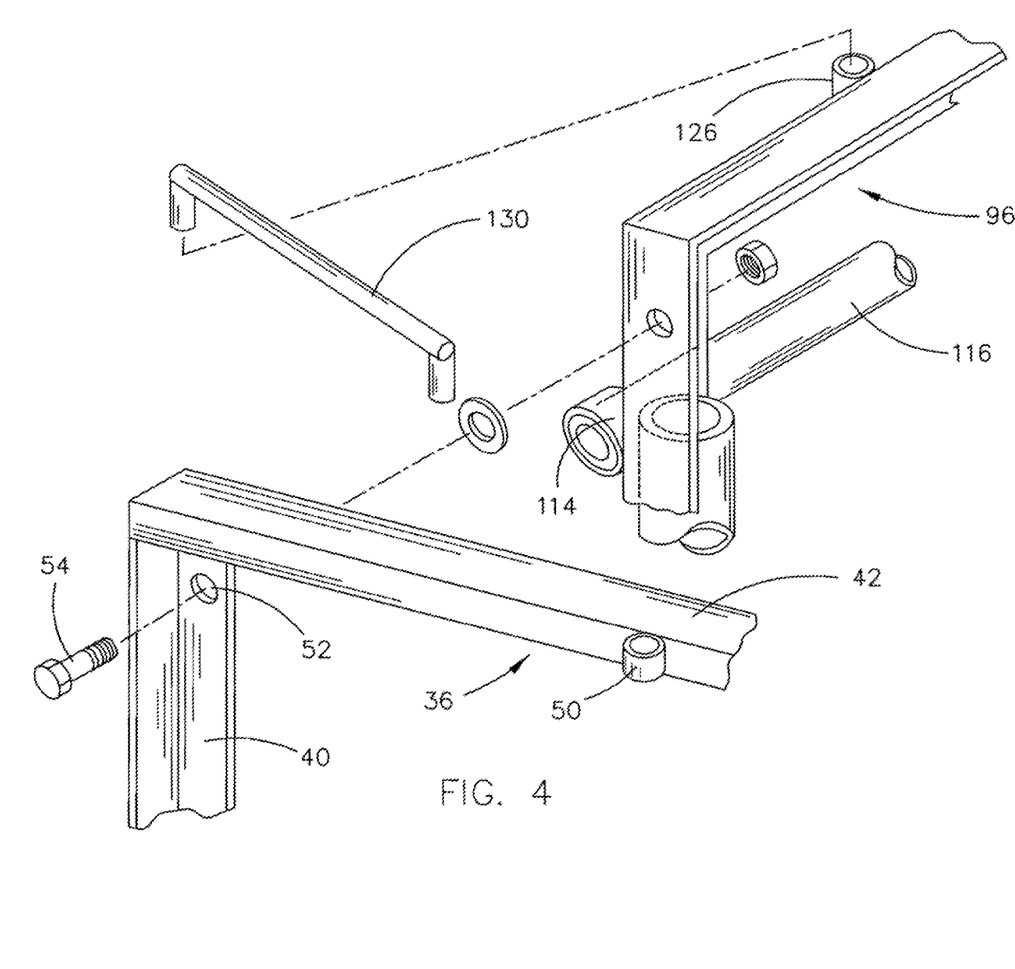
FIG. 4 is a partial perspective view of one of the panel fences of this invention.
Figure 5:
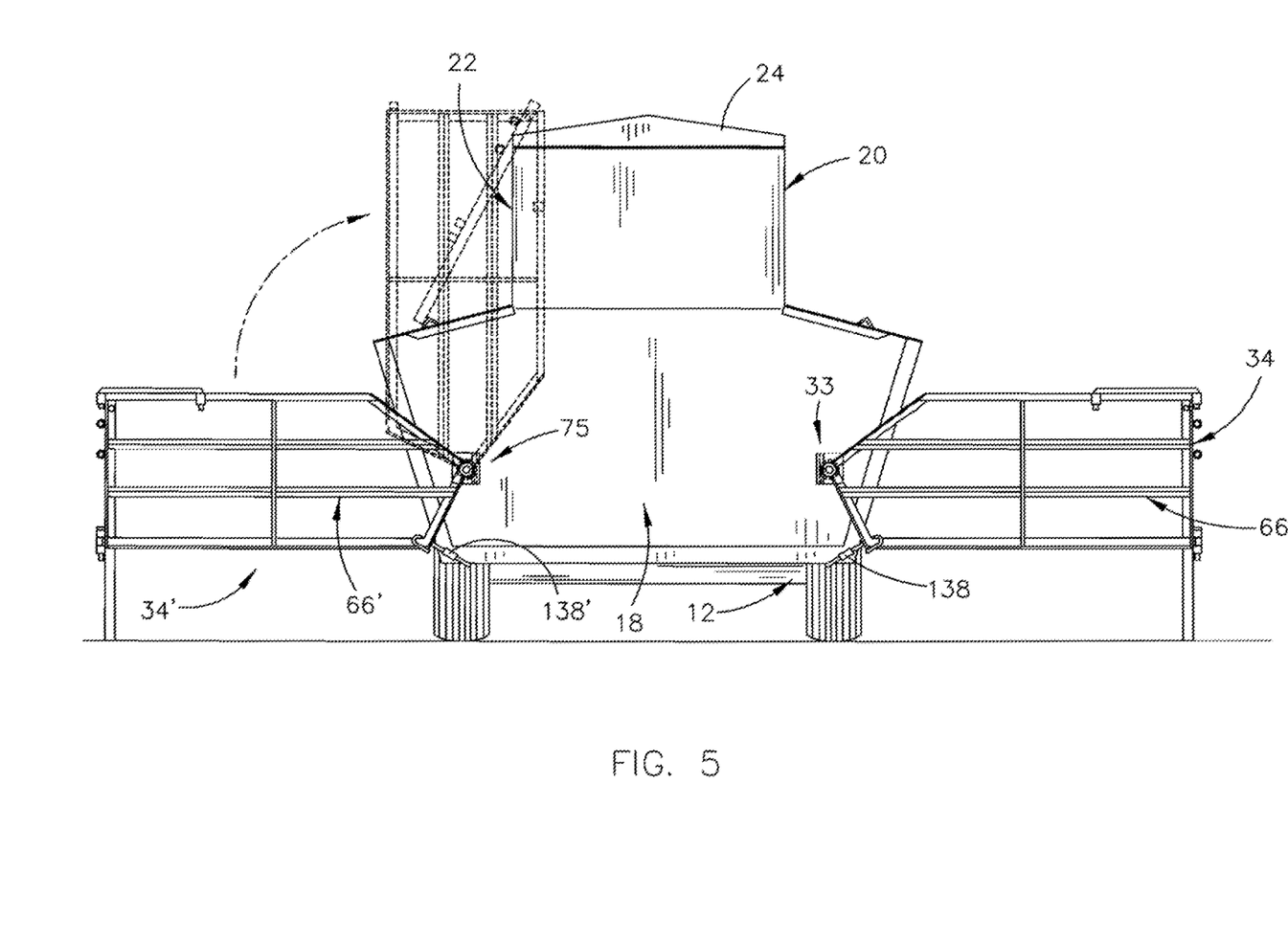
FIG. 5 is a rear view of the calf creep feeder of this invention with the panel fences thereof in the lowered creep feeder position and the broken lines illustrating one of the panel fences being in the upper stowed position.
Figure 6:
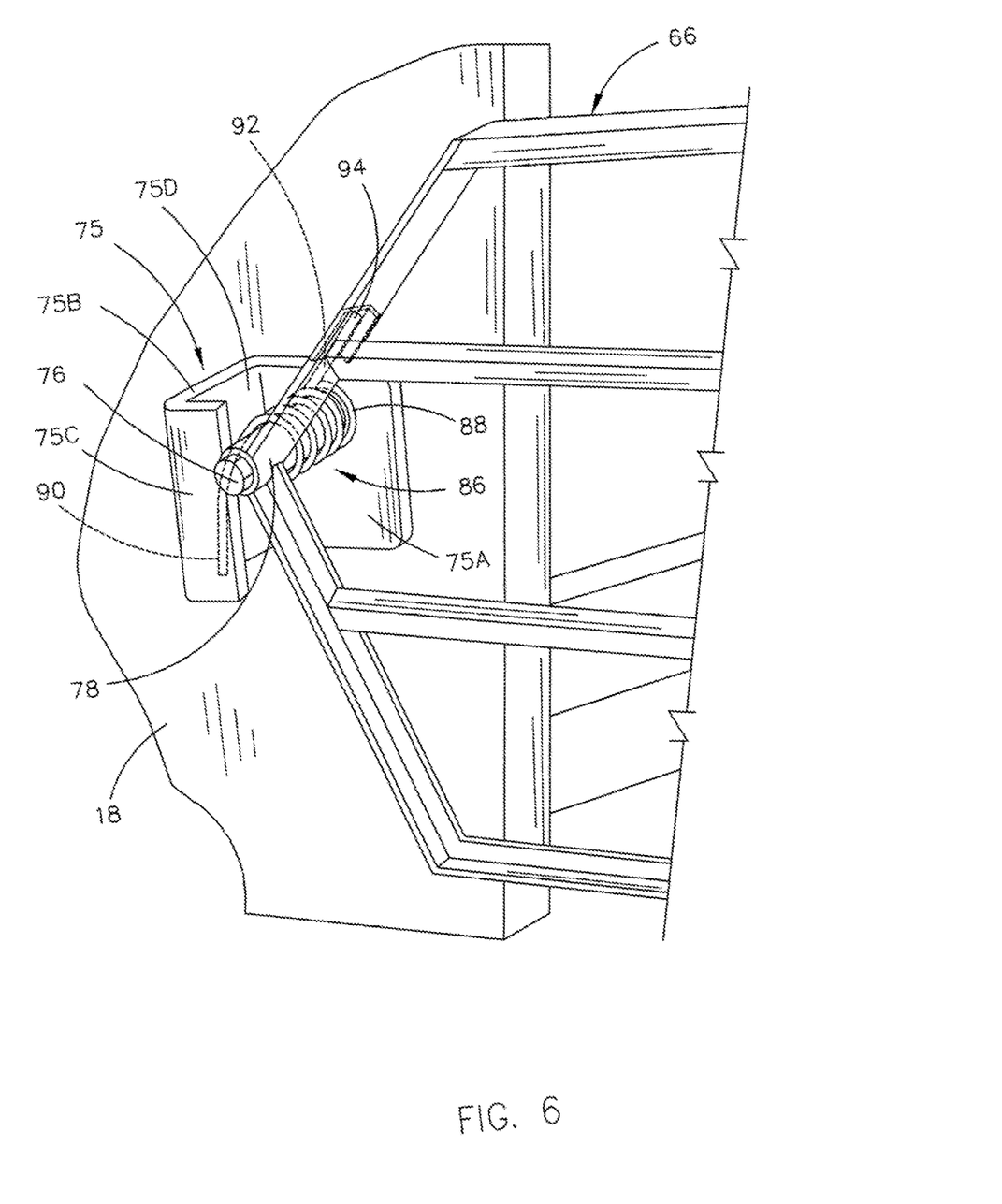
FIG. 6 is a partial perspective view which illustrates the manner in which the inner end of the second side panel is pivotally secured to the feed enclosure.

A first panel fence 34 is positioned at side 30 of feed enclosure 14 and a second panel fence 34' is positioned at side 31 of feed enclosure 14. Inasmuch as panel fences 34 and 34' are identical, only panel fence 34 will be described in detail with "'" designating identical structure on panel fence 34'. Further, there may be times when only a single panel fence will be utilized at one side of the feeder. Panel fence 34 includes a first side or forward panel 36 which has an inner end 38, an outer end 40, an upper end 42 and a lower end 44. The inner end 38 of panel 36 is pivotally secured to the forward wall 16 of feed enclosure 14 by bolt 46 extending through collar 48, which is secured to the inner end 38 of panel 36, through bolt opening 33E in plate 33 and through the opening formed in forward wall 16 of feed enclosure 14. A collar 50 is secured to the upper end 42 of panel 36 as seen in FIG. 3. The outer end 40 of panel 36 has an opening 52 formed therein at the upper end thereof which is adapted to receive pivot bolt 54 therein.

The numeral 56 refers to a helical torsion spring including a helix 58, end 60 extending from one end of helix 58, and end 62 extending from the other end of helix 58. Helix 58 embraces collar 48 and bolt 46 outwardly of base portion 33A of plate 33. End 60 of torsion spring 56 extends downwardly from helix 58 into the pocket 33D of plate 33 so that end 60 is captured therein. End 62 of torsion spring 56 extends from helix 58 and is captured by an angle iron 64 which is welded to the inner end 38 of panel 36.

Figure 1:
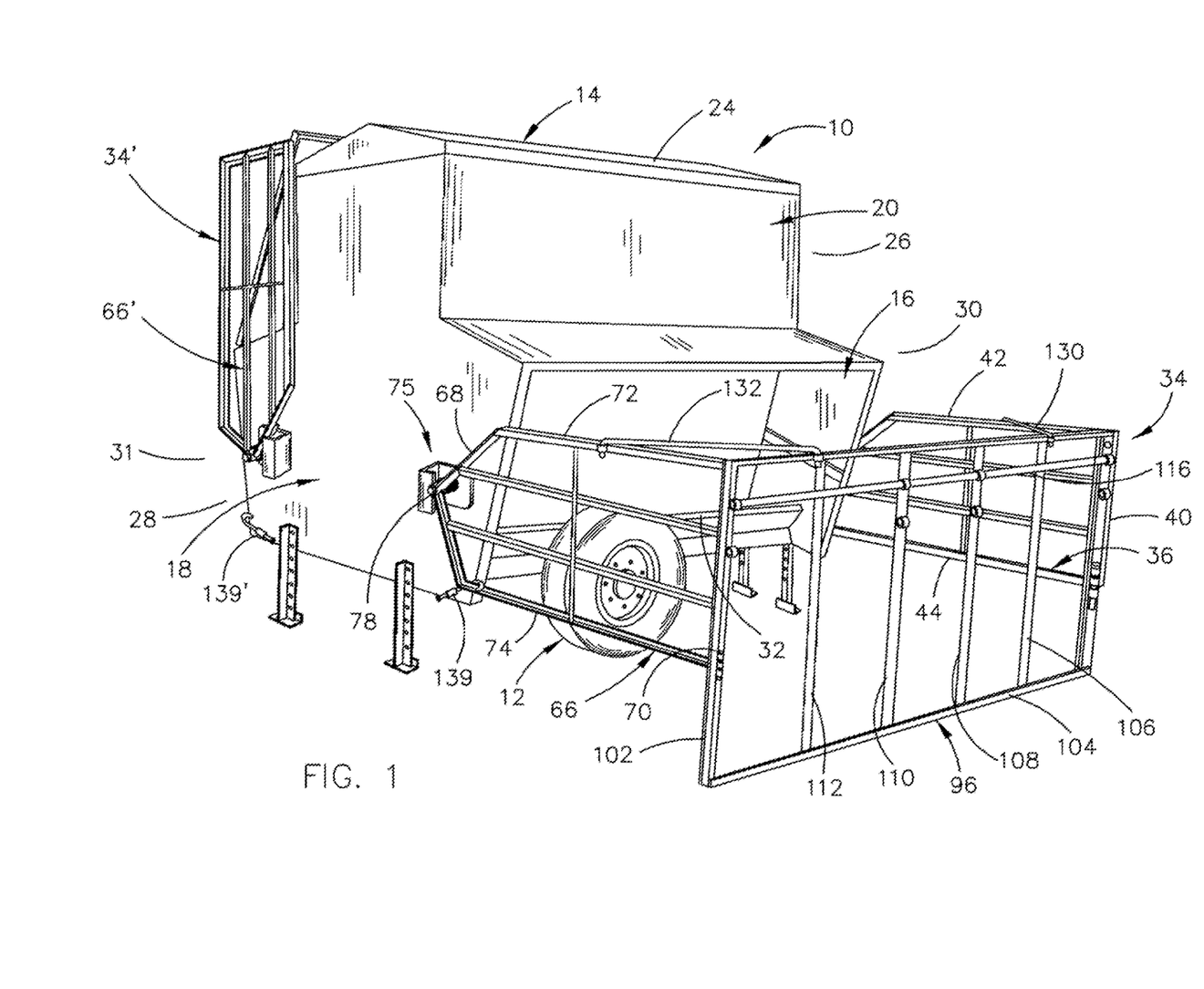
FIG. 1 is a rear perspective view of the calf creep feeder of this invention with the panel fence at one side of the feeder being in the creep feeder position and the panel fence at the other side of the feeder being in the upper stowed position.
Figure 2:
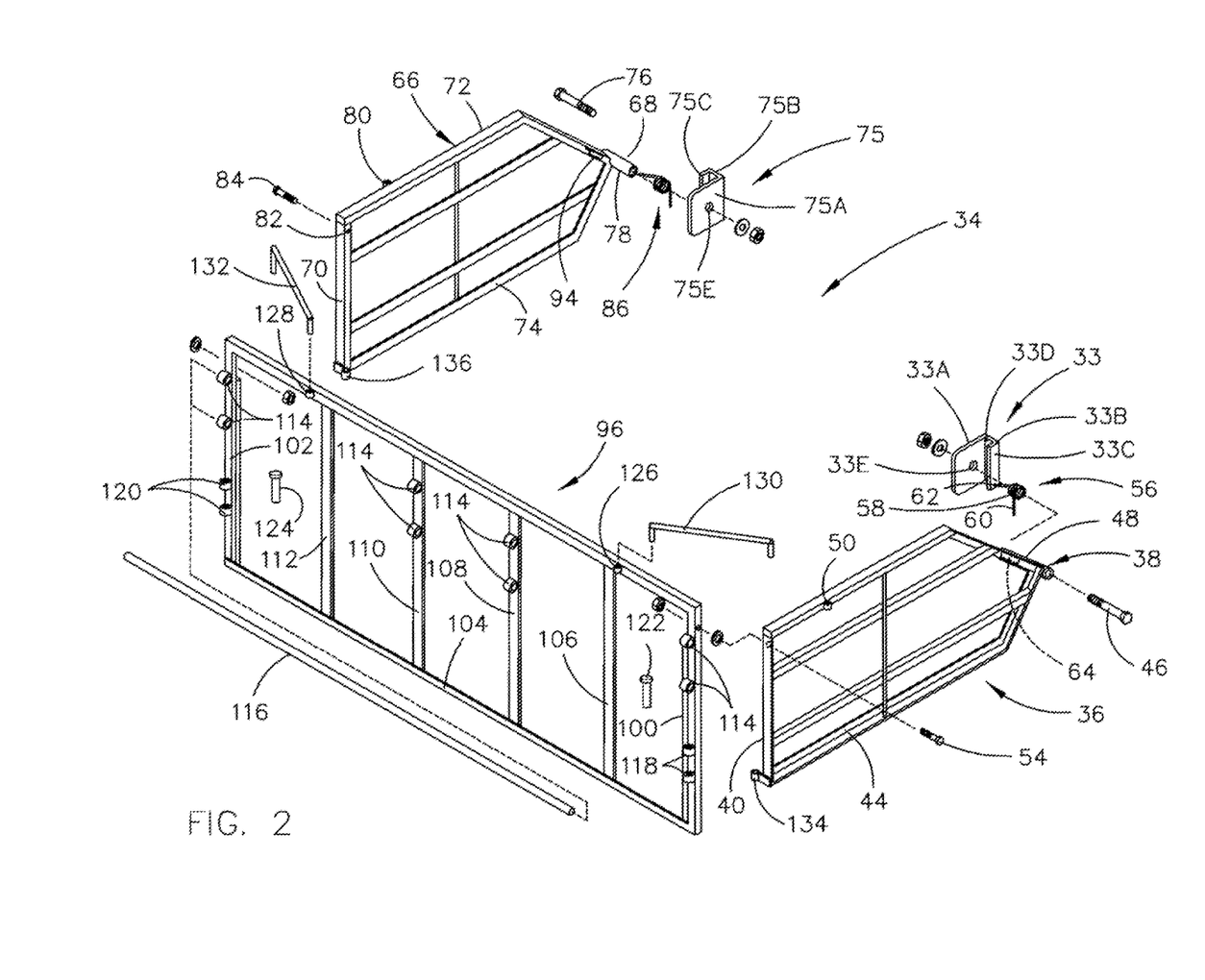
FIG. 2 is an exploded perspective view of one of the panel fences.

Panel fence 34 also includes a second side or a rearward panel 66 which has an inner end 68, an outer end 70, an upper end 72 and a lower end 74. As will be described in more detail hereinafter, a plate 75 is welded to the exterior surface of rearward wall 18 of feed enclosure 14. Plate 75 includes a base portion 75A, a side wall 75B, and an outer wall 75C which define a pocket 75D. Base portion 75A has a bolt opening 75E formed therein which registers with a bolt opening formed in rearward wall 18 of feed enclosure 14. The numeral 76 refers to a bolt which is configured to extend through collar 78 which is secured to the inner end 68 of panel 66. A collar 80 is secured to the upper end 72 of panel 66 as seen in FIG. 2. The outer end 70 of panel 66 has an opening 82 formed therein at the upper end thereof which is adapted to receive pivot bolt 84 therein.

The inner end 68 of panel 66 is pivotally secured to the rearward wall 18 of feed enclosure 14 by the bolt 76 extending through collar 78, which is secured to the inner end 68 of panel 66, through bolt opening 75E of plate 75 and through the opening formed in the rearward wall 18 of feed enclosure 14.

The numeral 86 refers to a helical torsion spring including a helix 88, an end 90 extending from one end of helix 88, and end 92 extending from the other end of helix 88. Helix 88 embraces collar 78 and bolt 76. End 90 of torsion spring 86 extends downwardly from helix 88 into the pocket 75D of plate 75 so that end 90 is captured therein. End 92 of torsion spring 86 extends from helix 88 and is captured by an angle iron 94 which is welded to the inner end 68 of panel 66.

The numeral 96 refers to an entrance panel which is positioned between the outer ends of panels 36 and 66. Panel 96 includes a horizontally disposed upper frame member, vertically disposed side frame members 100 and 102 which extend downwardly from the opposite ends of frame member 98, and a horizontally disposed lower frame member 104 which extends between the lower ends of frame members 100 and 102. Bars or frame members 106, 108, 110 and 112 extend between frame members 98 and 104 as seen in FIG. 2. The bars 106, 108, 110 and 112 are horizontally spaced-apart with the spacing therebetween permitting calves to pass therebetween but which prevents cows from passing therebetween. Frame members 100 and 102 and bars 108 and 110 have spaced-apart collars 114 thereon which are adapted to have the elongated rod 116 mounted therein to selectively reduce the height of the passageways between frame members 98 and 104. A pair of collars 118 and 120 are mounted on frame members 100 and 102 respectively which are adapted to receive pins 122 and 124 therein as will be explained hereinafter. The upper end of frame member 100 of panel 96 is pivotally secured to the upper end of frame member 40 of panel 36 by the pivot bolt 54. The upper end of frame member 102 is pivotally secured to the upper end of frame member 70 of panel 66 by pivot bolt 84.

The frame member 98 of panel 96 has collars 126 and 128 secured thereto in a spaced-apart manner. The downwardly extending ends of brace 130 are configured to be selectively received in collars 50 and 126 as will be described hereinafter. The downwardly extending ends of brace 132 are configured to be selectively received by the collars 80 and 128 as will also be described hereinafter.

The lower end of panel 96 is positioned inwardly of the collars 134 and 136 on the lower ends of frame members 40 and 70 respectively to prevent the lower end of panel 96 from being raised upwardly and outwardly with respect to panels 36 and 66. The collars 134 and 136 also maintain panel 96 in the proper vertically disposed position as the fence 34 is moved between its creep position and stowed position.

When the panels 36, 66 and 96 are in their lower creep feeding position, the collar 134 will be positioned between the pair of collars 118 on frame member 100 and the collar 136 will be positioned between the pair of collars 120 on frame member 102. Pin 122 is extended downwardly through the upper collar 118, through collar 134 and through the lower collar 118. Pin 124 is extended downwardly through the upper collar 120, through collar 136 and through the lower collar 120. The pins 122 and 124 prevent the panel 96 from being pivotally raised.

A locking device 138 has one end thereof secured to wall 16 and its other end selectively secured to panel 36 to prevent the fence from being raised by the cattle. A locking device 139 identical to locking device 138 has one end secured to wall 18 and its other end selectively secured to panel 66 to prevent the fence from being raised by the cattle.

The torsion springs 56 and 86 serve as lift assist springs to enable the fence 34 to be more easily raised from its lower position to its upper stowed position.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A creep feeder, comprising:
   a frame having a forward end, a rearward end, a first side and a second side;
   a feed enclosure mounted on said frame;
   said feed enclosure including:
   (a) an upstanding forward wall with an upper end, a lower end, a first side, a second side and an exterior side;
   (b) an upstanding rearward wall with an upper end, a lower end, a first side, a second side, and an exterior side;
   (c) an upstanding first side wall with an upper end, a lower end, a forward end and a rearward end; and
   (d) an upstanding second side wall with an upper end, a lower end, a forward end and a rearward end;
   said first side wall of said feed enclosure having feed discharge outlets at said lower end thereof;
   said forward wall of said feed enclosure having a spring capture structure secured thereto at said exterior side thereof at said first side thereof;
   said rearward wall of said feed enclosure having a spring capture structure secured thereto at said exterior side thereof at said first side thereof;
   a vertically disposed first side panel having an upper end, a lower end, an inner end and an outer end;
   said inner end of said first side panel having a spring arm capture structure secured thereto;
   said inner end of said first side panel being pivotally secured to said forward wall of said feed enclosure at said first side thereof whereby said first side panel is selectively movable between a lower creep feeder position to an elevated stowed position;
   a vertically disposed second side panel having an upper end, a lower end, an inner end and an outer end;
   said inner end of said second side panel having a spring arm capture structure secured thereto;
   said inner end of said second side panel being pivotally secured to said rearward wall of said feed enclosure at said first side thereof whereby said second side panel is selectively movable between a lower creep feeder position to an elevated stowed position;
   a first entrance panel having an upper end, a lower end, a forward end, and a rearward end;
   said forward end of said first entrance panel, at said upper end thereof, being pivotally secured to said outer end of said first side panel, at said upper end thereof, and said rearward end of said first entrance panel, at said upper end thereof, being pivotally secured to said outer end of said second side panel, at said upper end thereof, whereby said first entrance panel is configured to be movable from a first vertically disposed creep feeder position to a second upper stowed position with said first and second side panels;
   a first helical torsion spring;
   said first helical torsion spring including a helix, with first and second ends, having a first spring arm extending from said first end thereof, and a second spring arm extending from said second end thereof;
   said first spring arm of said first helical torsion spring being secured to said spring capture structure at said exterior side of said forward wall of said feed enclosure;
   a second helical torsion spring;
   said second helical torsion spring including a helix, with first and second ends, having a first spring arm extending from said first end thereof and a second spring arm extending from said second end thereof;
   said first spring arm of said second helical torsion spring being secured to said spring capture structure at said exterior side of said rearward wall of said feed enclosure;
   said second spring arm of said first helical torsion spring being secured to said spring arm capture structure at said inner end of said first side panel;
   said second spring arm of said second helical torsion spring being secured to said spring arm capture structure at said inner end of said second side panel; and
   said first and second helical torsion springs being configured to assist in moving said first side panel, said second side panel and said first entrance panel from said lower creep feeder positions to said stowed positions.

2. A creep feeder, comprising:
   a frame having a forward end, a rearward end, a first side and a second side;
   a feed enclosure mounted on said frame;
   said feed enclosure including:
   (a) an upstanding forward wall with an upper end, a lower end, a first side, a second side and an exterior side;
   (b) an upstanding rearward wall with an upper end, a lower end, a first side, a second side, and an exterior side;
   (c) an upstanding first side wall with an upper end, a lower end, a forward end and a rearward end; and
   (d) an upstanding second side wall with an upper end, a lower end, a forward end and a rearward end;
   said first wall of said feed enclosure having feed discharge outlets at said lower end thereof;
   said second wall of said feed enclosure having feed discharge outlets at said lower end thereof;
   said forward wall of said feed enclosure having a spring capture structure secured thereto at said exterior side thereof at said first side thereof;
   said rearward wall of said feed enclosure having a spring capture structure secured thereto at said exterior side thereof at said first side thereof;
   said forward wall of said feed enclosure having a spring capture structure secured thereto at said exterior side thereof at said second side thereof;
   said rearward wall of said feed enclosure having a spring capture structure secured thereto at said exterior side thereof at said second side thereof;
   a vertically disposed first side panel having an upper end, a lower end, an inner end and an outer end;
   said inner end of said first side panel having a spring arm capture structure secured thereto;
   said inner end of said first side panel being pivotally secured to said forward wall of said feed enclosure at said first side thereof whereby said first side panel is selectively movable between a lower creep feeder position to an elevated stowed position;

a vertically disposed second side panel having an upper end, a lower end, an inner end and an outer end;

said inner end of said second side panel having a spring arm capture structure secured thereto;

said inner end of said second side panel being pivotally secured to said rearward wall of said feed enclosure at said first side thereof whereby said second side panel is selectively movable between a lower creep feeder position to an elevated stowed position;

a first entrance panel having an upper end, a lower end, a forward end, and a rearward end;

said forward end of said first entrance panel, at said upper end thereof, being pivotally secured to said outer end of said first side panel, at said upper end thereof, and said rearward end of said first entrance panel, at said upper end thereof, being pivotally secured to said outer end of said second side panel, at said upper end thereof, whereby said first entrance panel is configured to be movable from a first vertically disposed creep feeder position to a second upper stowed position with said first and second side panels;

a first helical torsion spring;

said first helical torsion spring including a helix, with first and second ends, having a first spring arm extending from said first end thereof, and a second spring arm extending from said second end thereof;

said first spring arm of said first helical torsion spring being secured to said spring capture structure at said exterior side of said forward wall of said feed enclosure;

a second helical torsion spring;

said second helical torsion spring including a helix, with first and second ends, having a first spring arm extending from said first end thereof and a second spring arm extending from said second end thereof;

said first spring arm of said second helical torsion spring being secured to said spring capture structure at said exterior side of said rearward wall of said feed enclosure;

said second spring arm of said first helical torsion spring being secured to said spring arm capture structure at said inner end of said first side panel;

said second spring arm of said second helical torsion spring being secured to said spring arm capture structure at said inner end of said second side panel;

said first and second helical torsion springs being configured to assist in moving said first side panel, said second side panel and said first entrance panel from said lower creep feeder positions to said stowed positions;

a vertically disposed third side panel having an upper end, a lower end, an inner end and an outer end;

said inner end of said third side panel being pivotally secured to said forward wall of said feed enclosure at said second side thereof whereby said third side panel is selectively movable between a lower creep feeder position to an elevated stowed position;

a vertically disposed fourth side panel having an upper end, a lower end, an inner end and an outer end;

said inner end of said fourth side panel being pivotally secured to said rearward wall of said feed enclosure at said second side thereof whereby said fourth side panel is selectively movable between a lower creep feeder position to an elevated stowed position;

a second entrance panel having an upper end, a lower end, a forward end, and a rearward end;

said forward end of said second entrance panel, at said upper end thereof, being pivotally secured to said outer end of said third side panel at said upper end thereof and said rearward end of said second entrance panel being pivotally secured at said upper end to said outer end of said fourth side panel whereby said second entrance panel is configured to be movable from a first vertically disposed creep feeder position to a second upper stowed position with said third and fourth side panels;

a third helical torsion spring;

said third helical torsion spring including a helix, with first and second ends, having a first spring arm extending from said first end thereof, and a second spring arm extending from said second end thereof;

said first spring arm of said third helical torsion spring being secured to said spring capture structure at said exterior side of said forward wall, at said second side thereof, of said feed enclosure;

a fourth helical spring;

said fourth helical torsion spring including a helix, with first and second ends, having a first spring arm extending from said first end thereof and a second spring arm extending from said second end thereof;

said first spring arm of said fourth helical torsion spring being secured to said spring capture structure at said exterior side of said rearward wall, at said second side thereof, of said feed enclosure;

said second spring arm of said third helical torsion spring being secured to said spring arm capture structure at said inner end of said third side panel;

said second spring arm of said fourth helical torsion spring being secured to said spring arm capture structure at said inner end of said fourth side panel; and said third and fourth helical torsion springs being configured to assist in moving said third side panel, said fourth side panel and said second entrance panel from said lower creep feeder positions to said stowed positions.

* * * * *